US012714963B2

(12) United States Patent
Schuhmacher

(10) Patent No.: US 12,714,963 B2
(45) Date of Patent: Aug. 25, 2026

(54) FILTER ELEMENT FOR AN AIR-FILTER DEVICE OF A MOTOR VEHICLE, AND AIR-FILTER DEVICE

(71) Applicant: DAIMLER TRUCK AG, Leinfelden-Echterdingen (DE)

(72) Inventor: Eric Schuhmacher, Stuttgart (DE)

(73) Assignee: DAIMLER TRUCK AG, Leinfelden-Echterdingen (DE)

(*) Notice: Subject to any disclaimer, the term of this patent is extended or adjusted under 35 U.S.C. 154(b) by 383 days.

(21) Appl. No.: 18/263,851

(22) PCT Filed: Feb. 2, 2022

(86) PCT No.: PCT/EP2022/052375

§ 371 (c)(1),
(2) Date: Aug. 1, 2023

(87) PCT Pub. No.: WO2022/167433

PCT Pub. Date: Aug. 11, 2022

(65) Prior Publication Data

US 2024/0115984 A1 Apr. 11, 2024

(30) Foreign Application Priority Data

Feb. 2, 2021 (DE) ..................... 10 2021 000 515.5

(51) Int. Cl.

*B01D 46/10* (2006.01)
*B01D 46/00* (2022.01)
*B60H 3/06* (2006.01)

(52) U.S. Cl.

CPC ......... *B01D 46/10* (2013.01); *B01D 46/0002* (2013.01); *B01D 46/0006* (2013.01); *B60H 3/06* (2013.01); *B01D 2259/4566* (2013.01)

(58) Field of Classification Search

CPC ............ B01D 46/0002; B01D 46/0005; B01D 46/0006; B01D 46/10; B01D 46/521; B01D 2259/4566; B60H 3/06

See application file for complete search history.

(56) References Cited

U.S. PATENT DOCUMENTS

2004/0172927 A1 9/2004 Lee

FOREIGN PATENT DOCUMENTS

CN 109529483 A 3/2019
DE 10245427 A1 4/2004

(Continued)

OTHER PUBLICATIONS

Machine translation of DE202005011078U1 (Year: 2005).*
International search report for PCT/EP2022/052375 malled on Apr. 4, 2022.

*Primary Examiner* — Robert Clemente
(74) *Attorney, Agent, or Firm* — Dennemeyer & Associates LLC

(57) ABSTRACT

The invention relates to a filter element (10) for an air filter device of a motor vehicle, having a frame which at least partially surrounds a filter material (18) of the filter element (10). The frame comprises a front wall (20) which extends perpendicularly to an insertion direction (22), in which the filter element (10) can be inserted into a receiving space (14) of a housing (12) of the air filter device. At least one fastening element (26) is arranged on a front side (24) of the front wall (20), onto which a cover of the air filter device designed to close the receiving space (14) can be fixed. A plate-shaped base body of the front wall (20) has a narrow side beyond which a retaining tab (76) of the filter element (10) formed separately from the at least one fastening element (26) projects. The filter element (10) can be secured against movement in or opposite to the insertion direction (22) by introducing the retaining tab (76) into a retaining (Continued)

Figures 1, 2:
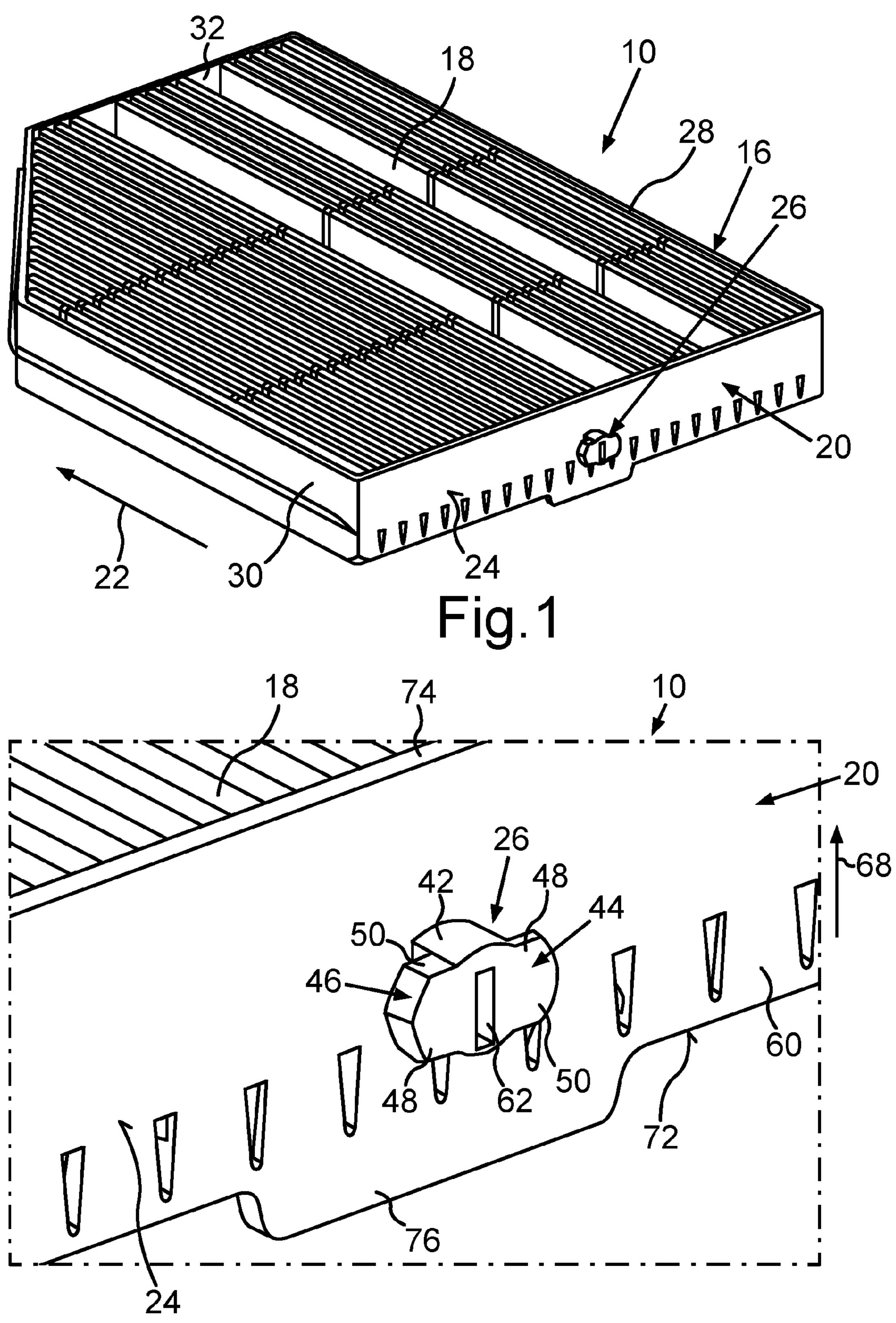

recess (80) provided on the side of the housing (12) of the air filter device. The invention further relates to an air filter device having such a filter element (10).

11 Claims, 8 Drawing Sheets

(56) References Cited

FOREIGN PATENT DOCUMENTS

| | | | | | |
|---|---|---|---|---|---|
| DE | 202005011078 | U1 | | 9/2005 | |
| DE | 202006004420 | U1 | | 6/2006 | |
| EP | 1304244 | A2 | * | 4/2003 | ............. B01D 46/10 |
| EP | 2769758 | A1 | | 8/2014 | |
| FR | 2815699 | A1 | | 4/2002 | |
| JP | 2014161752 | A | | 9/2014 | |
| JP | 2020529920 | A | | 10/2020 | |
| KR | 101448484 | B1 | * | 10/2014 | ......... B01D 46/0006 |

* cited by examiner 32
18
10
28
16
26
20
22
30
24

18
74
10
20
26
68
42
48
50
44
46
48
62
50
60
72
76
24

12
64
14
78
68

78
102
100
100
80
82
82
68
102
22

12
10
20
26
90
18
76
30
78
82
80
22

12
10
14
20
24
26
18
76
30
78
82
80
22

FILTER ELEMENT FOR AN AIR-FILTER DEVICE OF A MOTOR VEHICLE, AND AIR-FILTER DEVICE

CROSS-REFERENCE TO RELATED APPLICATIONS

This is a 35 U.S.C. 371 National Stage Patent Application of International Application No. PCT/EP2022/052375, filed Feb. 2, 2022, which claims priority to German application 10 2021 000 515.5, filed Feb. 2, 2021, each of which is hereby incorporated by reference in its entirety.

The invention relates to a filter element for an air filter device of a motor vehicle, having a frame which at least partially surrounds a filter material of the filter element. The frame comprises a front wall which extends essentially perpendicularly to an insertion direction. The filter element can be inserted into a receiving space of a housing of the air filter device in the insertion direction. At least one fastening element is arranged on a front side of the front wall. A cover of the air filter device designed to close the receiving space can be fixed to the fastening element. The invention further relates to an air filter device having such a filter element.

DE 198 04 452 A1 shows an air filter for an air conditioning system of a motor vehicle with a filter housing with an insertion opening for a filter insert, wherein the opening can be closed by means of a cover which is firmly connected to the filter insert. On its outer side, with which it comes into contact with the housing, the cover projects beyond the insertion opening. The side of the cover pointing inwards—in the insertion direction—corresponds in its extension to the width of the insertion opening and has a rigid locking lug on one side, which engages behind a corresponding edge of the filter housing in the closed state. The correct seating of the cover in the closed insertion opening is ensured by an elastically deformable seal running around approximately centrally between the outer and inner sides of the cover.

DE 20 2005 005 067 U1 shows a filter element for use in a filter receptacle, wherein the access opening provided for inserting the filter element in the filter receptacle can be closed via a separate closure element. For this purpose, hook-shaped fastening elements that are aligned with one another project from the closure element and are assigned corresponding recesses on the filter receptacle. To form a seal between the closure element and the filter receptacle, the filter element has a flat sealing element on its end face facing the closure element, which projects beyond the edge of the end face on all sides, wherein engaging openings for inserting the fastening elements are formed in the protrusions.

DE 10 2015 003 297 A1 describes an air filter device for a motor vehicle comprising a housing, in which a filter element can be received, and a cover. The filter element has at least one latching device in the form of two opposing retaining tabs or eyelets that can be moved in opposite directions, which, as soon as the filter element is inserted into the housing and the cover is placed thereon, can be latched to corresponding retaining lugs on the housing and on the cover, whereby the three interacting parts are sealed from one another.

DE 10 2017 007 497 A1 shows an air filter for a motor vehicle, in which, in turn, a filter element is inserted through an insertion opening into the housing of the air filter and the insertion opening can be closed in a sealing manner by a cover element. The filter element has at least one retention element with a fastening element, wherein the retention element latches behind when the filter element is inserted in the housing, wherein the fastening element connected to the retention element is then in a position in which a locking strut assigned to the cover element can be passed through a passage opening in the fastening element and rotated, whereby the cover is connected in a sealed manner to the housing.

DE 10 2007 018 215 A1 describes an air filter for an air conditioning system of a motor vehicle, in which a frame runs around a folded filter medium. Two receptacles project from one wall of the frame, into which latching means can be inserted. The latching means are arranged on a cover with which a housing can be closed, in which the frame with the folded filter medium is received. In this regard, a sealing element, which bears against the edge of the housing when the housing is closed by means of the cover, is formed in one piece with a connecting plate of the cover.

With such an air filter, it has proven difficult to handle the cover in such a way that the latching means can latch in the receptacles. One of the reasons for this is that a defined installation position of the frame in the housing is not specified.

In addition, the two latching means arranged on the cover must be precisely aligned so that they can be inserted into the receptacles. This is particularly difficult when the receptacles are not easily visible to a person involved in the assembly of the cover.

Furthermore, DE 10 2015 004 645 A1 describes a filter element for filtering combustion air which is supplied to an internal combustion engine of a motor vehicle. The filter element has a filter medium body, which is supported and held on an internal carrier body in the form of a support structure. End plates are located on axial end faces of the carrier body. Two tab-shaped components, which have respective latching elements, are connected to one of the end plates via respective connecting parts. The components with the respective latching elements are formed in one piece with the end plate via the connecting parts. Furthermore, the components project from the filter element in the lateral direction. In an installation position of the filter element, the latching elements latch with counter-latching elements which are arranged on a filter housing. The latching elements are secured in a latching position by means of a cover placed on the filter housing.

A disadvantage here is the fact that the laterally protruding components with the latching elements take up a comparatively large amount of installation space inside the filter housing, which can therefore not be used or is not available for filtering the air to be filtered.

In addition, with this air filter device, the cover can also be attached to the filter housing when there is no filter element in the filter housing. This is also disadvantageous.

The object of the present invention is to create a filter element of the type mentioned at the outset, which simplifies the closing of the receiving space by means of the cover, and to specify an air filter device having such a filter element.

This object is achieved by a filter element having the features of claim 1 and an air filter device having the features of claim 6. Advantageous configurations with expedient further developments of the invention are specified in the dependent patent claims and in the following description.

The filter element according to the invention for an air filter device of a motor vehicle has a frame which at least partially surrounds a filter material of the filter element. The frame comprises a front wall. The front wall extends essentially perpendicularly to an insertion direction, in which the filter element can be inserted into a receiving space of a housing of the air filter device. The housing of the air filter device is also referred to below as the "air filter housing" or simply as the "housing". At least one fastening element is arranged on a front side of the front wall. A cover of the air filter device, which is designed to close the receiving space, can be fixed to the at least one fastening element. A plate-shaped base body of the front wall has a narrow side. A retaining tab of the filter element, which is formed separately from the at least one fastening element, projects beyond this narrow side. The filter element can be secured against movement in the insertion direction by introducing the retaining tab into a retaining recess provided on the side of the housing of the air filter device.

In other words, when the retaining tab is introduced into the retaining recess of the housing, the filter element can no longer be inserted further into the housing or pulled out of the housing counter to the insertion direction. Consequently, the entire filter element is aligned in the correct position by introducing the retaining tab into the retaining recess. In this installation position of the filter element in the housing, the at least one fastening element is then also aligned in the correct position, so that the cover of the air filter device can be reliably fixed or fastened to the at least one fastening element. Consequently, the closing of the receiving space by means of the cover is simplified by the filter element.

When the retaining tab engages in the retaining recess provided on the side of the housing of the air filter device, then not only is a pre-fixation of the filter element in relation to the cover of the air filter housing achieved, but any slippage of the filter element within the receiving space of the housing is also avoided, even if the insertion direction is not horizontal, but rather the filter element is inserted or pushed into the receiving space obliquely to the horizontal. In such a case, too, the retaining tab prevents any slipping out of the receiving space or further slipping into the receiving space as soon as the retaining tab has been introduced into the retaining recess.

This applies in particular if the retaining tab in the installation position of the filter element projects essentially in the direction of gravity beyond the narrow side of the plate-shaped base body of the front wall, which is then a lower narrow side of the base body.

Due to the separate formation of the at least one fastening means to the retaining tab, which is in particular spaced apart from the retaining tab, the fastening means is also very easily accessible for a corresponding closure element, which is formed on the cover. In particular, with such a configuration it can be achieved that the closure element arranged on the cover encloses or encompasses the fastening element. This is conducive to a particularly robust and resilient, and at the same time very reliable, fixation of the cover on the filter element.

A further advantage of the filter element with the at least one fastening element arranged on the front side of the front wall is that the air filter device of the motor vehicle can only be operated when the filter element is installed in or introduced into the receiving space. This is because the at least one fastening element, which is part of the filter element, is required to securely close the receiving space by means of the cover of the air filter device. In other words, it is not possible for the cover to bear in a manner in which the position is secured or in a tight-fitting manner against the air filter housing if the filter element is not introduced or installed in the receiving space of the housing. In this way it can be prevented that the air filter device is operated improperly (namely without the filter element). Consequently, the filter element enables a particularly functionally reliable operation of the air filter device.

In particular, the introduction of the retaining tab into the retaining recess provided on the side of the housing of the air filter device ensures that the at least one fastening element is aligned in the correct position and can therefore be used to securely fix the cover to the air filter housing in position.

In addition, the at least one fastening element is exchanged together with the filter element when the filter element is changed. This is advantageous in view of the fact that, for example, a clamping geometry and/or retaining geometry of the fastening element is subject to wear when the cover of the air filter device is fixed to the fastening element in order to use the cover to close the receiving space formed in the air filter housing. The at least one fastening element that is subject to wear is therefore also renewed or replaced when the filter element is replaced.

Due to the arrangement of the at least one fastening element on the front side of the front wall, which is opposite a rear side of the front wall facing the filter material, the at least one fastening element is also very easily accessible. This facilitates the interaction of the fastening element with a closure element of the cover in order to achieve a tight fitting bearing of the cover against the housing as a result of this interaction.

The introduction of the retaining tab into the retaining recess provided on the side of the housing also means that when the filter element is removed, i.e. when the filter element is removed from the receiving space counter to the insertion direction, the front wall and thus the entire filter element must initially be raised slightly. In this way, it is possible to prevent the filter element and in particular the filter material of the filter element from getting caught in the region of the housing of the air filter device and possibly being damaged as a result.

This is particularly useful when the filter element is only temporarily removed, for example to remove dust or solids from the filter element by shaking or tapping it off and then installing the filter element in the housing once more.

Handling the filter element in this way is particularly advantageous when the motor vehicle having the air filter device is designed as a truck which is to be used in an environment with a high dust load, for example on a construction site or the like.

The retaining tab is preferably formed in one piece with the base body of the front wall. In this way, the retaining tab can be provided particularly easily and with little effort when manufacturing the frame.

Furthermore, the retaining tab can have a thickness in the insertion direction which corresponds to a thickness of the narrow side of the plate-shaped base body. As a result, the retaining tab is designed to be particularly robust and resilient.

The at least one fastening element can preferably be inserted into a sleeve-shaped retaining region of a closure element arranged on the cover. In this regard, the at least one fastening element encompassed by the retaining region can be clamped by the closure element of the cover by rotating the closure element about an axis of rotation. In this way, a very robust and resilient attachment or fixation of the cover on the filter element can be achieved.

Alternatively, the at least one fastening element can also advantageously have a sleeve-shaped retaining region, into which the closure element arranged on the cover can be inserted, wherein, by rotating the closure element about an axis of rotation, the at least one fastening element encompassed by the retaining region can be clamped by the closure element of the cover. An inverted geometry is thus realised, which provides an equally advantageous solution.

The at least one fastening element is preferably spaced apart from a lower narrow side of the plate-shaped base body in the vertical direction of the front wall. On the one hand, this is advantageous with regard to the good accessibility of the fastening element for the closure element of the cover.

Furthermore, when the filter element is introduced or pushed into the receiving space, gravity ensures that the front wall is lowered as viewed in the insertion direction, and the retaining tab is thus introduced into the retaining recess. The filter element is then particularly well secured in the receiving space against accidentally slipping out. Because in order to be able to be removed from the receiving space, the filter element would first have to be raised in the region of the front wall.

The at least one fastening element preferably has at least one retaining part spaced apart from the front side of the front wall. In this regard, the at least one retaining part can be engaged from behind by a corresponding retaining part of the closure element for the purpose of closing the receiving space by means of the cover. With such a formation of the fastening element, a particularly tight fitting bearing of the cover against the air filter housing can be achieved. Furthermore, the cover is then also well secured in its closed position.

The at least one retaining part is preferably designed as a wing projecting from a shaft of the fastening element transversely to the insertion direction. Such a wing can be engaged from behind by the corresponding retaining part of the closure element arranged on the cover in a particularly simple manner. In addition, such a wing takes up very little installation space.

If the geometry is reversed, i.e. if the closure element arranged on the cover can be inserted into the sleeve-shaped retaining region on the fastening element, the above statements regarding the geometry of the retaining region on the closure element apply analogously to the design of the retaining region on the fastening element.

Nevertheless, the cover can be securely fixed in the region of a receiving opening, which can be provided in the air filter housing for introducing the filter element into the receiving space. Because when the closure element of the cover interacts with the fastening element and the corresponding retaining part of the closure element engages behind the wing, the cover is fixed in a particularly secure manner.

It is also advantageous if the at least one retaining part has a first end region and a second end region, wherein the at least one retaining part has a shape extending in a ramp-like manner from the first end region to the second end region. The corresponding retaining part of the closure element can be moved along such a ramp when the cover is fixed on the filter element, when the cover is secured on the housing in its closed position.

The shape extending in a ramp-like manner of the retaining part on the one hand simplifies the fixation of the cover on the fastening element. In addition, a particularly tight fitting bearing of the cover against the air filter housing can be achieved. Because of the ramp-like shape, when the cover is secured in its closed position, in which the cover bears against the housing, a movement of the cover towards the housing that supports the sealing can be achieved.

In addition, tolerances, in particular manufacturing tolerances, can be compensated for to a particularly large extent in this way, and the cover nevertheless bears against the housing in a tight-fitting manner when the cover is fixed to the at least one fastening element of the filter element.

The frame of the filter element preferably comprises two side walls which extend in the insertion direction from the front wall. In this regard, the filter element has at least one support web which is spaced apart from the front wall and supports the filter material. The at least one support web connects the side walls to one another. By providing such a support web, the frame and also the filter material, which the frame of the filter element at least partially (and preferably completely) surrounds, or around which the frame of the filter element extends at least partially (and preferably completely), are well stabilized. This makes it possible, for example, to remove solids in the form of dust or the like from the filter material that have been retained on a raw air side of the filter material after the filter element has been removed from the receiving space by shaking off or tapping it off, without permanently affecting the shape of the filter material.

If the filter material has a plurality of folds, the support web can have projections designed in the manner of teeth or pins, which project from, for example, a strip-shaped back of the support web and engage in the folds of the filter material. Thus, the shape of the folds of the filter material can be retained particularly well even during and after removing solids from the folded filter material by tapping or shaking off or the like.

The air filter device according to the invention for a motor vehicle has a filter element according to the invention, wherein the filter element is introduced into a receiving space which is formed in a housing of the air filter device.

The air filter device can be designed in particular as an air filter device of an air conditioning system or ventilation device of the motor vehicle. Furthermore, the air filter device can be provided for an intake tract of an internal combustion engine of the motor vehicle, i.e. as a filter for the air drawn in by the internal combustion engine or supplied by other means.

Preferably, when the retaining tab of the filter element engages in a retaining recess provided on the side of the housing of the air filter device, the receiving space can be closed by means of a cover of the air filter device. For this purpose, the cover can be fixed to the at least one fastening element of the filter element. In this way it, can be ensured that the receiving space can only be securely closed by means of the cover if the filter element is correctly installed in the air filter housing.

In addition, the engagement of the retaining tab of the filter element in the retaining recess of the housing ensures that the at least one fastening element of the filter element is aligned in the correct position or is in a position in which the fastening element can interact with at least one closure element formed on the cover. In this way, the housing can be securely closed by means of the cover.

The housing of the air filter device preferably has at least one retention element, which is arranged upstream of the retaining recess in the insertion direction. Such a retention element prevents, to a particularly large extent, that the filter element is unintentionally moved out of the receiving space as soon as the retaining tab is located in the retaining recess. In particular, the retaining tab can bear against the at least one retention element when the retaining tab is introduced into the retaining recess and the cover is fixed to the filter element.

The at least one retention element can be designed in particular as a ramp-like retaining tooth sloping obliquely upwards as viewed in the insertion direction. In the direction of longitudinal extension of the retaining recess, several such ramp-like retaining teeth can be arranged upstream of the retaining recess in the insertion direction. An underside of the retaining tab can then be pushed very easily over these ramp-like retaining teeth until the retaining tab is then lowered, preferably due to gravity, into the retaining recess, which is arranged downstream of the retaining teeth in the insertion direction. The retaining tab can therefore become undercut, in particular with the ramp-like retaining teeth, as soon as the retaining tab engages in the retaining recess.

The housing preferably has at least one ramp, which is arranged next to the retaining recess in the direction of longitudinal extension of the retaining recess. In this regard, the at least one ramp is designed sloping obliquely downwards starting from the retaining recess as viewed in the insertion direction. Such a ramp can very easily and reliably prevent the filter element from getting caught and/or the filter material from being damaged when the filter element is removed or pulled out of the receiving space.

If the filter element has the at least one support web which connects the side walls of the frame to one another, the at least one ramp also prevents the filter element with such a support web from getting caught on a component of the housing or the support web itself from getting caught on such a component.

Preferably, the at least one ramp has an apex region, wherein a height of the at least one ramp in the apex region is greater than the maximum height of the at least one retention element. It is thus very easy to ensure that the frame of the filter element does not get caught on the at least one retention element when the filter element is pulled out of the receiving space.

In addition or alternatively, the at least one ramp can be designed to slope obliquely upwards towards the apex region as viewed in the insertion direction. This facilitates the insertion of the filter element into the receiving space which is formed in the housing of the air filter device.

The cover preferably has at least one closure element which is rotatable relative to a base body of the cover. In this regard, in a closed position of the closure element, at least one retaining part of the closure element engages behind a corresponding retaining part of the at least one fastening element. Due to such an interaction of the closure element with the fastening element, a particularly secure and tight fixation of the cover in its position on the housing can be achieved when the cover closes the receiving space of the housing. The closure element can in particular be designed in the manner of a rotary closure.

In particular, the cover can be pivotably held on the air filter housing. Then, by folding down the cover, the at least one closure element of the cover, which corresponds to the fastening element of the filter element, can interact with the fastening element. In addition, such a closing of the receiving space by means of the cover can be accomplished very intuitively.

The described advantages and preferred embodiments of the filter element according to the invention also apply to the air filter device according to the invention and vice versa.

Further advantages, features and details of the invention can be found in the following description of preferred exemplary embodiments and from the drawings. The features and feature combinations cited in the description above, and the features and feature combinations cited in the description of the figures below and/or shown in the figures alone are applicable not only in the respective combination indicated but also in other combinations or in isolation, without departing from the scope of the invention.

Figures 3, 4:
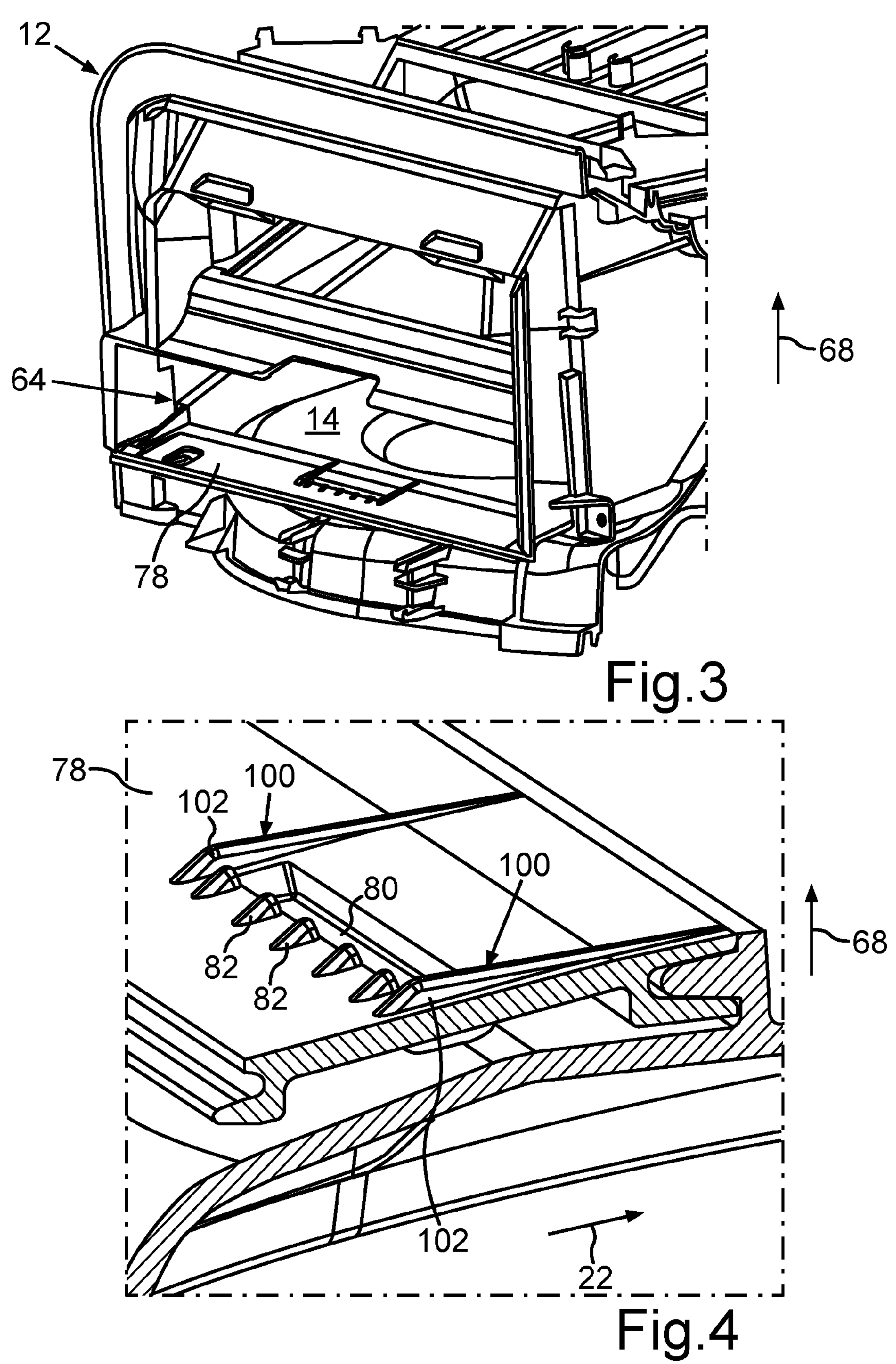
Figure 5:
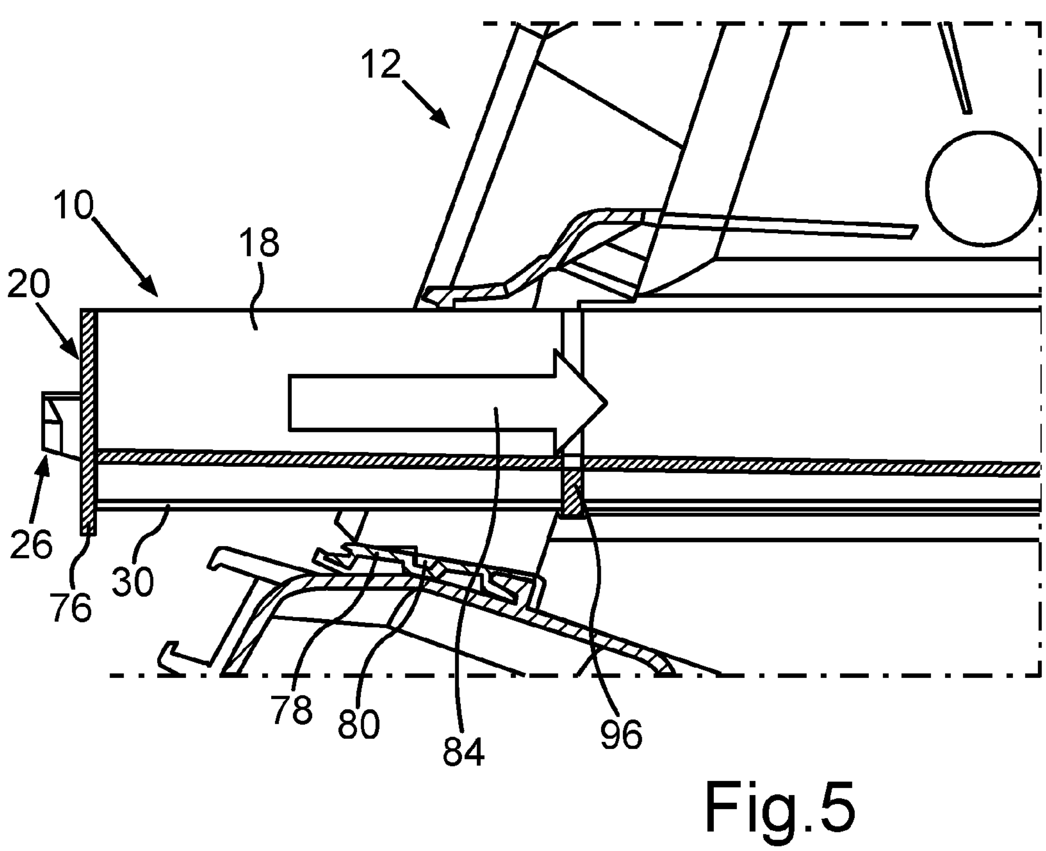
Figure 6:
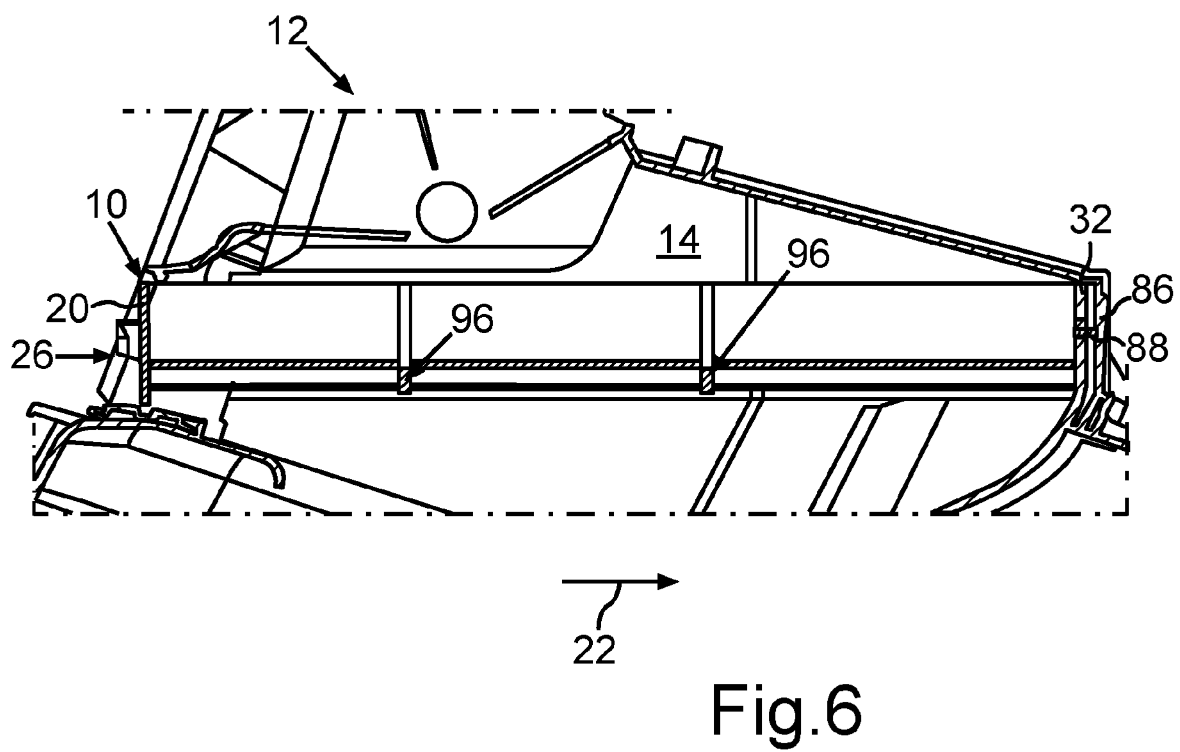
Figures 7, 8:
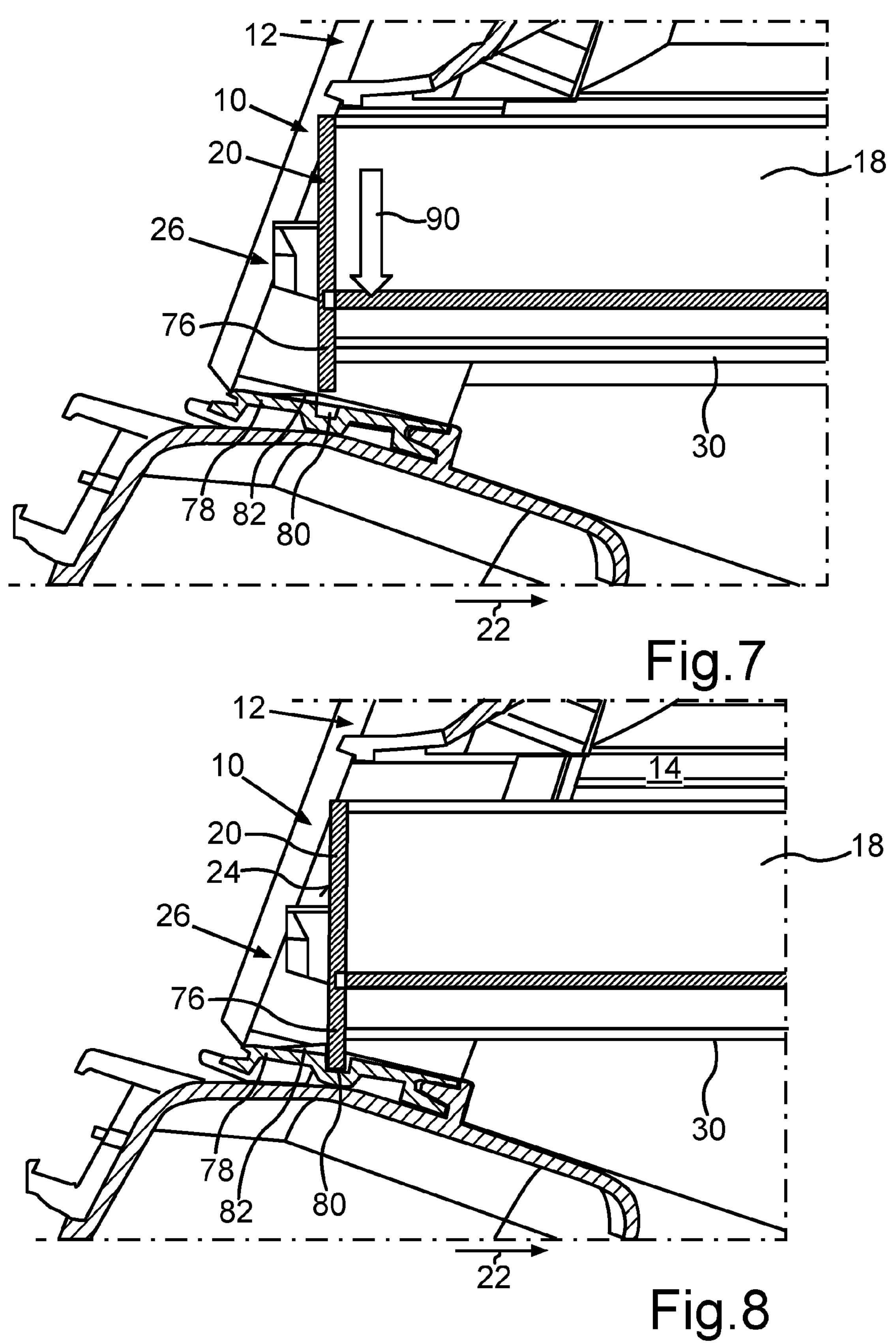
Figure 9:
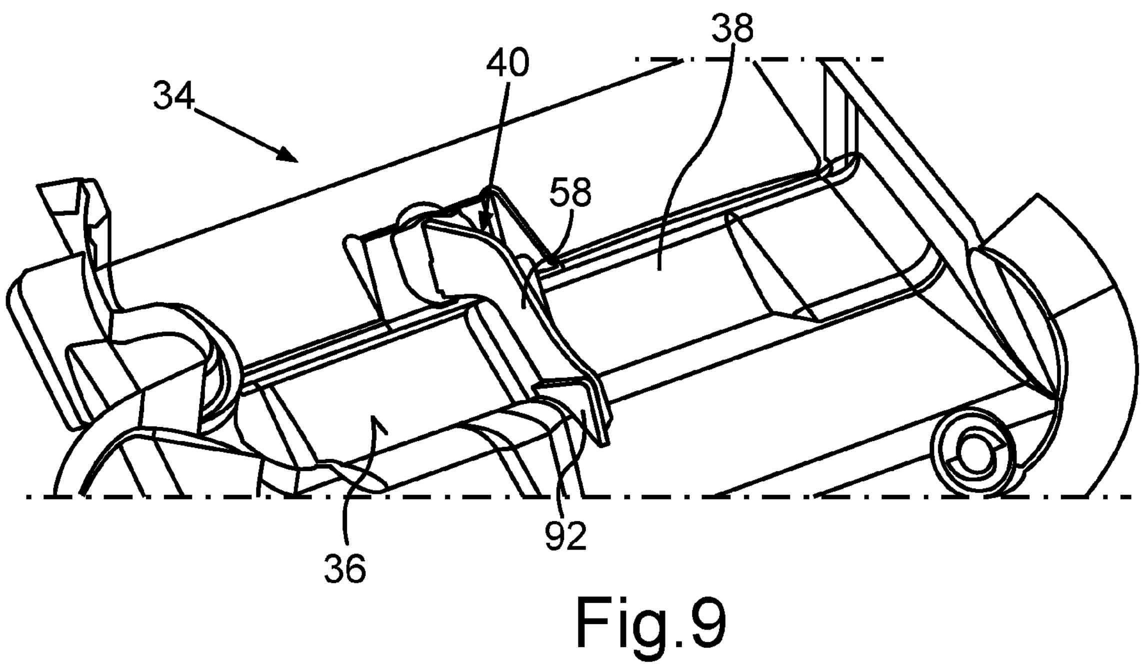
Figure 10:
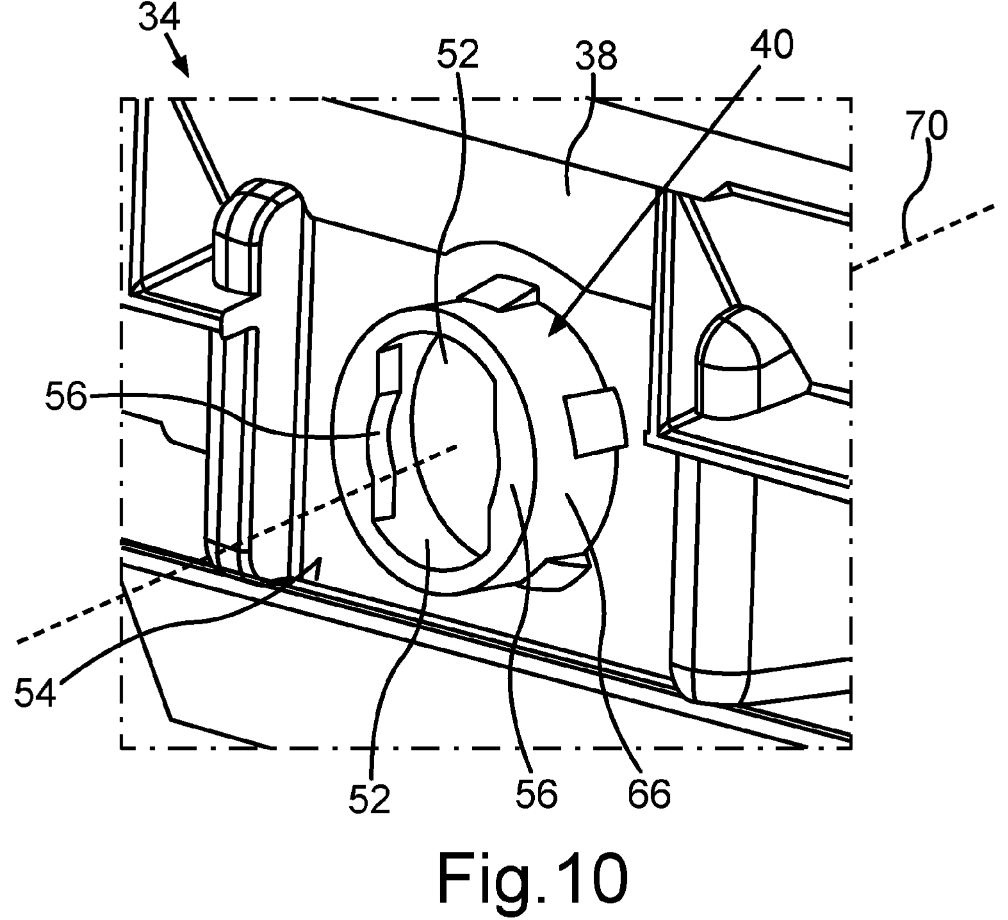
Figure 11:
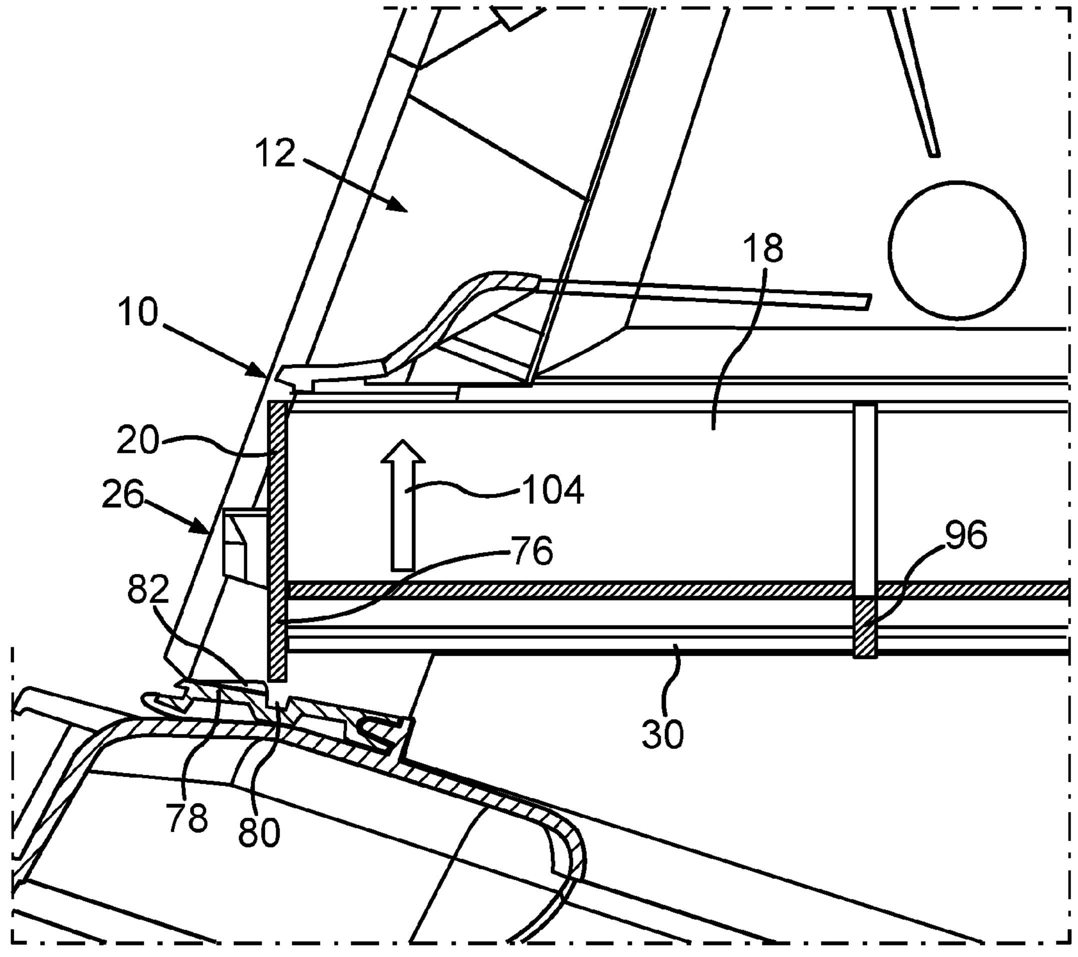
Figures 12, 13:
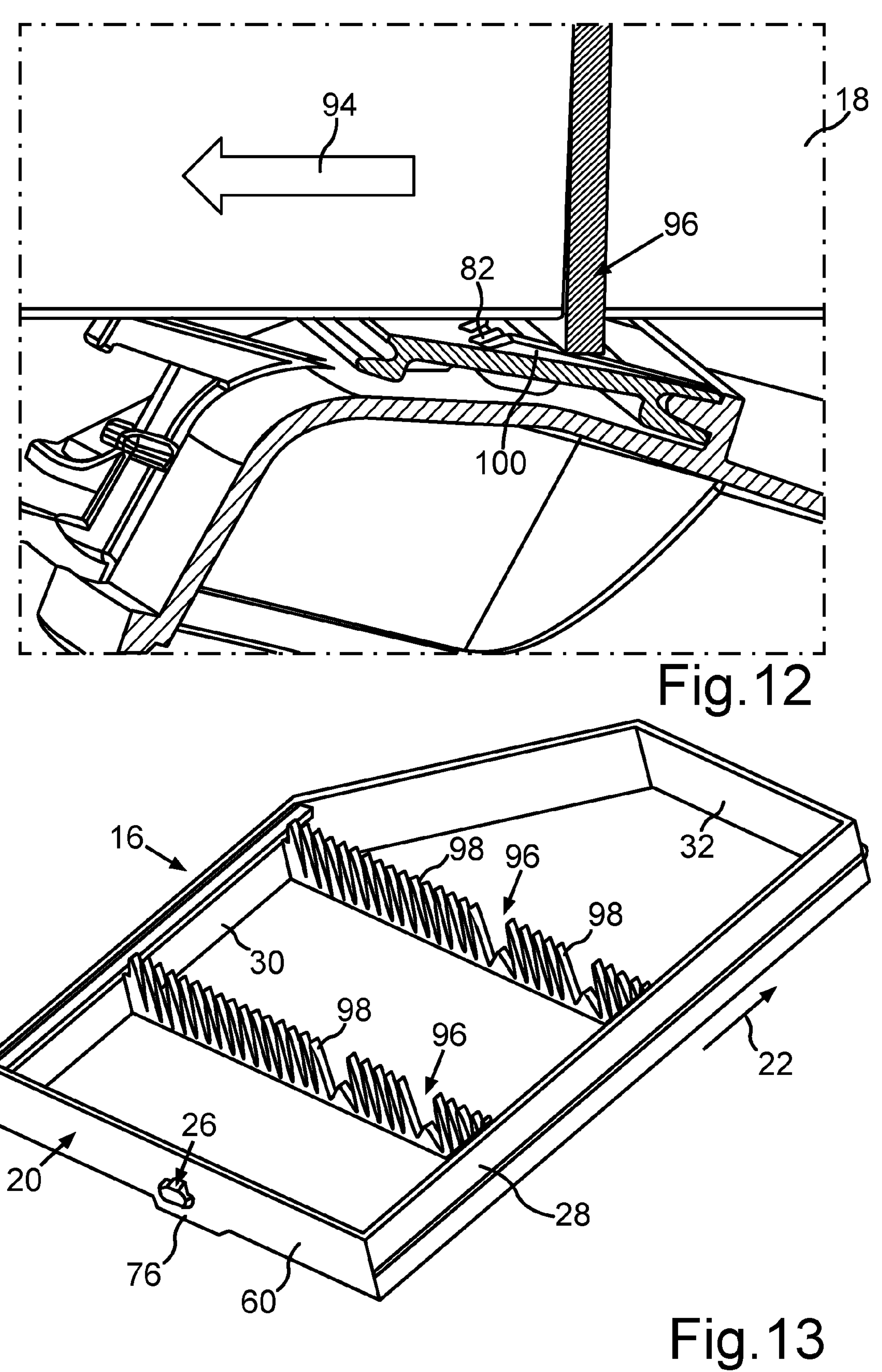
Figure 14:
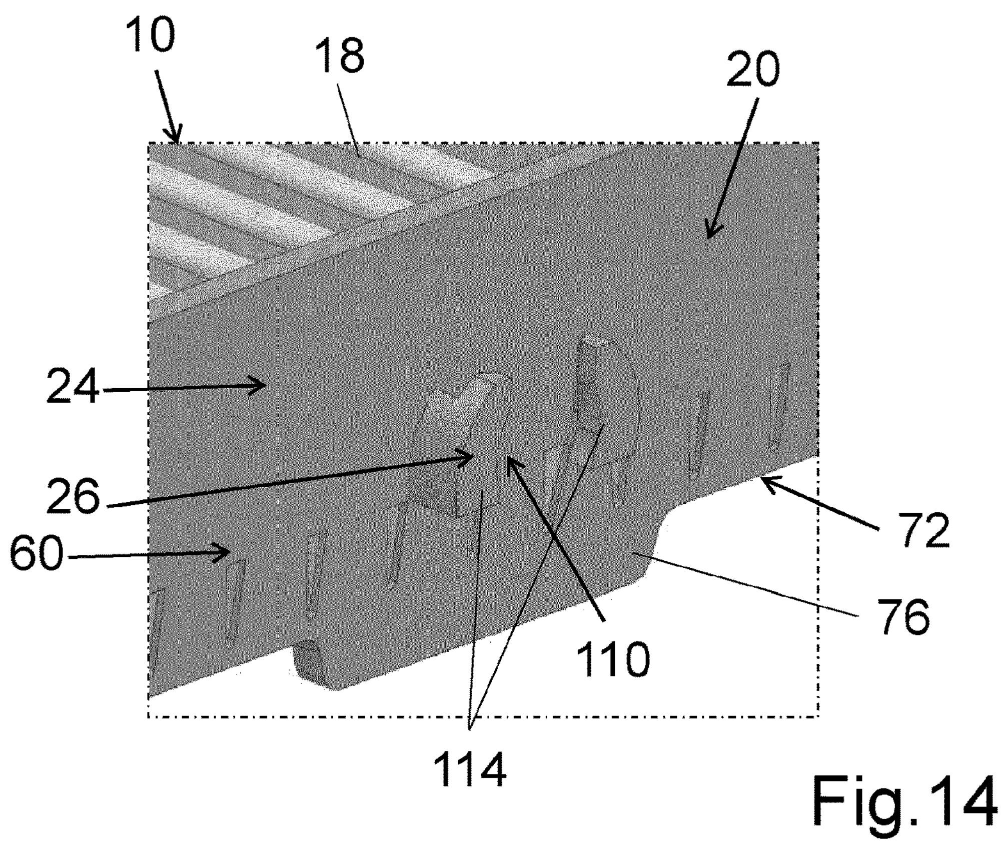
Figure 15:
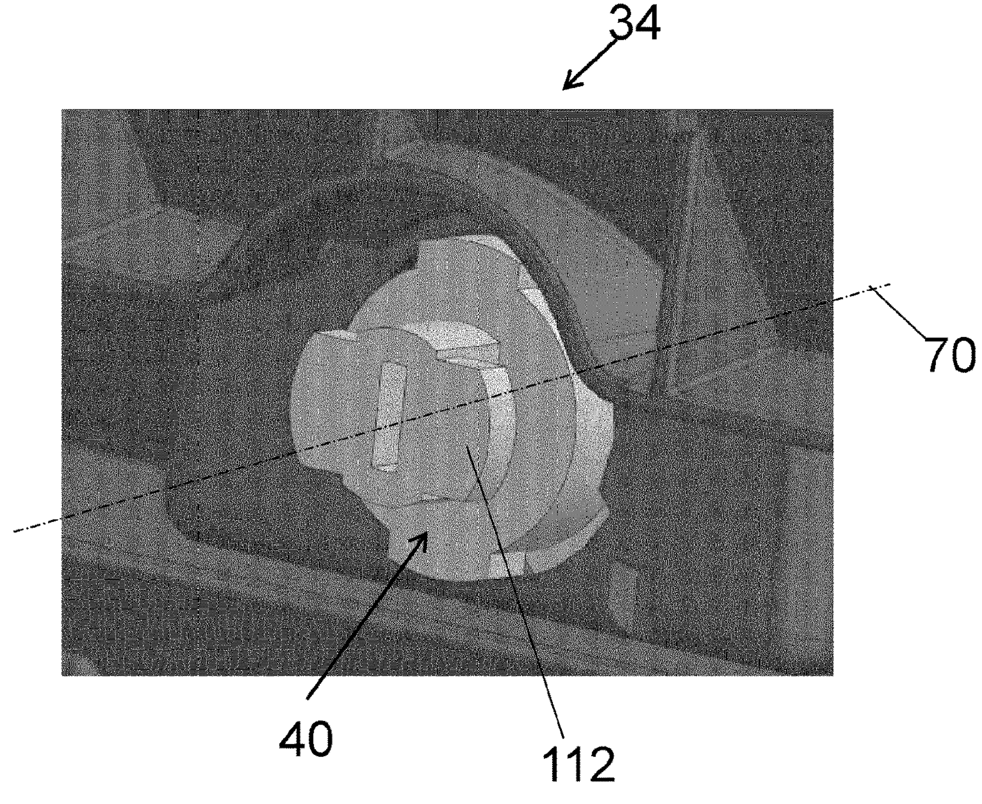

The figures show:

FIG. 1 a filter element for an air filter device of a motor vehicle in a schematic perspective view;

FIG. 2 an enlarged detail view of the filter element according to FIG. 1, in which a fastening element arranged on a front side of a front wall of a frame of the filter element can be seen more clearly;

FIG. 3 a sectional view of a housing of the air filter device, which is designed to receive the filter element according to FIG. 1;

FIG. 4 a partially cross-sectional detail view in the region of a receiving opening of the housing, through which the filter element according to FIG. 1 can be pushed into the housing;

FIG. 5 a partially cross-sectional side view of the introduction of the filter element according to FIG. 1 into the housing according to FIG. 3;

FIG. 6 a partially cross-sectional side view of the filter element introduced into a receiving space of the housing, which has reached its end position in the insertion direction;

FIG. 7 an enlarged detail view of a front section of the filter element and of the housing, wherein the front wall of the filter element is located at the height of a retaining recess which is formed on the side of the housing;

FIG. 8 the lowering of the front wall due to gravity in such a way that a retaining tab of the filter element formed in one piece with the front wall engages in the retaining recess;

FIG. 9 a sectional view from the front of a cover for the housing of the air filter device, wherein the cover has a closure element designed as a rotary closure, which interacts with the fastening element of the filter element shown in FIG. 2 in order to fix the cover;

FIG. 10 a sectional rear view of the cover in the region of the rotary closure;

FIG. 11 a first step wherein the filter element is removed or when the filter element is disassembled, wherein the filter element is raised in the region of the front wall and the retaining tab is thus moved out of the retaining recess;

FIG. 12 in a partially cross-sectional view a support web of a plurality of support webs of the frame sliding along ramps arranged on both sides of the retaining recess when the filter element is pulled out of the receiving space;

FIG. 13 a perspective view of the frame of the filter element comprising two support webs according to FIG. 1 without a filter material of the filter element;

FIG. 14 an alternative embodiment of the fastening element in a detail view; and FIG. 15 an alternative embodiment of the retaining part on the cover in a detail view.

In the figures, identical or functionally-identical elements are provided with the same reference signs.

FIG. 1 shows a schematic perspective view of a filter element 10 which is intended to be installed in a housing 12 (cf. FIG. 3) of an air filter device of a motor vehicle, designed in particular as a truck. A receiving space 14 is formed in the housing 12 of the air filter device (cf. FIG. 3), into which the filter element 10 shown in FIG. 1 can be introduced or installed.

The filter element 10 comprises a frame 16 which surrounds or encloses a filter material 18 of the filter element 10. If the filter element 10 is designed as a folded filter, the filter material 18 can have a plurality of folds, as exemplarily shown in the present case. However, other configurations of the filter material 18 through which air can flow during operation of the filter element 10 are also possible.

The frame 16, which in the present case completely surrounds or encloses the filter material 18 on the circumferential side, comprises a front wall 20. The front wall 20 extends perpendicularly to an insertion direction 22, which is illustrated in FIG. 1 by an arrow. In the insertion direction 22, the filter element 10 can be inserted into the receiving space 14, which is formed in the housing 12 or air filter housing (cf. FIG. 3).

A fastening element 26 is arranged on a front side 24 of the front wall 20 and is shown enlarged in FIG. 2. In the present case, the frame 16 also comprises two side walls 28, 30 which extend in the insertion direction 22 starting from the front wall 20.

At its rear end, the frame 16 is closed by means of a rear wall 32, which in the present case is designed to be angled. This is due to the shape of the housing 12, so that in variants of the filter element 10 a differently designed frame 16 can also be provided. Furthermore, the frame 16 does not have to circumferentially enclose the filter material 18, as exemplarily shown in the present case.

The fastening element 26 shown in FIG. 2 serves to fix or secure a cover element or cover 34 to the housing 12. The cover 34 is shown in FIG. 9 in a sectional view of its outer side 36 facing the area surrounding the housing 12.

A closure element is held on a base body 38 of the cover 34, which is designed as a rotary closure 40 in the present case. By means of a lever-like handle part 58, the rotary closure 40 can be rotated relative to the base body 38 of the cover 34 about an axis of rotation 70, which is indicated in FIG. 10. The fastening element 26 (cf. FIG. 2) interacts with the rotary closure 40 in order to secure the cover 34 in its closed position.

For this purpose, the fastening element 26 has a shaft 42 which in the present case is designed in the manner of a cylinder with an (optional) slot-shaped recess 62. The shaft 42 projects from the front side 24 of the front wall 20 in the insertion direction 22. Two retaining parts in the form of a first wing 44 and a second wing 46 extend from the shaft 42, in the present case essentially perpendicularly to the insertion direction 22.

From a respective first end region 48 towards a second, opposite end region 50, the respective wing 44, 46 preferably has a ramp-like shape. Accordingly, the respective wing 44, 46 increases in thickness starting from the respective first end region 48 in the direction of a height of the respective wing 44, 46 towards the opposite end region 50 of the respective wing 44, 46. The height of the respective wing 44, 46 thus corresponds to a thickness of the respective wing 44, 46 in the insertion direction 22. The ramp formed on the respective wing 44, 46 thus points in the direction of the front wall 20 of the filter element 10.

Recesses 52 (cf. FIG. 10) correspond to the wings 44, 46 and are formed on an inner side 54 of the cover 34 in the region of the rotary closure 40. Furthermore, the rotary closure 40 according to FIG. 10 has two retaining parts 56 on its inner side, which are designed to engage behind the wings 44, 46 of the fastening element 26 when the cover 34 is secured in its closed position, in which the cover 34 closes the receiving space 14 in the region of a receiving opening 64 (see FIG. 3). The filter element 10 can be introduced into the receiving space 14 via the receiving opening 64.

The wings 44, 46 provide clamping geometries or retaining geometries on the side of the filter element 10, which interact with the retaining parts 56 of the rotary closure 40 in order to secure the cover 34 in its closed position. In the present case, the rotary closure 40 attached to the cover 34 therefore has the retaining parts 56 which correspond to the clamping geometry or retaining geometry provided by the wings 44, 46.

The fastening element 26, which is preferably firmly connected to the frame 16 of the filter element 10 or is formed in one piece with the front wall 20, accordingly ensures that the cover 34 is fixed or secured in its closed position in the manner of a bayonet lock. And in the closed position, the cover 34 closes the receiving space 14 formed in the housing 12 in the region of the receiving opening 64.

It can also be seen from FIG. 10 that the rotary closure 40 has a sleeve-shaped retaining region 66, into which the fastening element 26 can be inserted, thus closing the cover 34. For this purpose, the recesses 52 of the rotary closure 40 must first be aligned in such a way that the wings 44, 46 can enter the sleeve-shaped retaining region 66 in the region of the recesses 52. The retaining region 66 then encompasses the fastening element 26. If the rotary closure 40 is then rotated or twisted about its axis of rotation 70 by actuating the handle part 58 (cf. FIG. 9), the retaining parts 56 of the rotary closure 40 engage behind the wings 44, 46. Due to the ramp-like shape of the wings 44, 46, the fastening element 26 is clamped by the rotary closure 40 of the cover 34, and the cover 34 is pulled against the housing 12 in order to form a tight fit.

Due to the geometry of the recesses 52 corresponding to the shape of the wings 44, 46, a person who closes the receiving space 14 of the housing 12 by means of the cover 34 can very easily visually recognize the mode of operation of the rotary closure 40. This is advantageous with regard to the easy operation of the rotary closure 40.

A stop 92 can be formed on the cover 34 for the handle part 58 (cf. FIG. 9), which defines an end position of the rotary closure 40 when the cover 34 is fixed in place. In this end position, the retaining parts 56 of the rotary closure 40 (cf. FIG. 10) engage behind the wings 44, 46 of the fastening element 26 (cf. FIG. 2).

It can also be seen from FIG. 2 that the front wall 20 has an upper narrow side 74. In the vertical direction 68 of the filter element 10, which is illustrated by an arrow in FIG. 2, this upper narrow side 74 is located opposite a lower narrow side 72 of a plate-shaped main body 60 of the front wall 20. The vertical direction 68 is preferably opposite to the direction of gravity in the installation position of the filter element 10.

In the present case, the filter element 10 has a retaining tab 76 which is formed separately from the fastening element 26 and is spaced apart from the fastening element 26. This retaining tab 76 projects beyond the lower narrow side 72 of the plate-shaped base body 60 of the front wall 20. In the present case, this retaining tab 76 is formed in one piece with the base body 60 of the front wall 20. The functions of this retaining tab 76 are explained below with reference to the following figures.

As can be seen from FIG. 3, the receiving opening 64 is delimited on the underside by a wall 78. In FIG. 4, this wall 78 is shown in sections and in a partially cross-sectional view.

In particular from FIG. 4 it can be clearly seen that in the wall 78 a retaining recess 80 is formed, which in terms of dimensions, in this case specifically with regard to a depth in the insertion direction 22 and a width perpendicular to the insertion direction 22, corresponds with the dimensions the retaining tab 76. Accordingly, the retaining tab 76 of the filter element 10 can be introduced into the retaining recess 80 which is provided on the side of the housing 12 of the air filter device. When the filter element 10 is in its installation position in the receiving space 14 of the housing 12 (cf. FIG. 8), the retaining tab 76 accordingly engages in the retaining recess 80.

The retaining tab 76 or latching tab, which is formed on the lower edge of the frame 16, thus acts in the manner of an abutment of the filter element 10. Accordingly, the retaining tab 76 prevents the filter element 10 from being able to slip out of the receiving space 14. This is particularly advantageous when the insertion direction 22 does not extend horizontally in the specific installation situation of the filter element 10, but extends in an inclined manner.

Furthermore, the retaining tab 76 serves to pre-fix the filter element 10 in relation to the cover 34. Because when the retaining tab 76 is located in the retaining recess 80, the fastening element 26 or retention element is also aligned in the correct position, namely such that the rotary closure 40 (cf. FIGS. 9 and 10) can interact with the fastening element 26.

In the present case, the fastening element 26 is arranged essentially centrally on the front side 24 of the front wall 20 in the width or transverse direction of the front wall 20, thus as viewed perpendicularly to the insertion direction 22. This causes the cover 34 to be pressed particularly evenly against the housing 12 when the rotary closure 40 is actuated and rotated about the axis of rotation 70 in the process.

Furthermore, the two large-area ramps of the fastening element 26 formed in the region of the wings 44, 46 ensure a very robust fixation of the cover 34 on the filter element 10.

The actuation of the rotary closure 40 also ensures that the front side 24 of the retaining tab 76 or the filter element 10 adjoining it comes to bear against retention elements, which in the present case are designed in the manner of ramp-like retaining teeth 82 (cf. FIG. 4), and which are arranged upstream of the retaining recess 80 in the insertion direction 22.

In the present case, the retaining teeth 82 slope obliquely upwards as viewed in the insertion direction 22, so that the retaining tab 76 initially moves in the vertical direction 68 when sliding along the retaining teeth 82 when the filter element 10 is pushed into the receiving space 14 via the receiving opening 64. This insertion of the filter element 10 into the receiving space 14 is illustrated in FIG. 5 by an arrow 84, whose direction is the same as the insertion direction 22.

FIG. 6 now shows the situation in which the filter element 10 has reached its horizontal end position in the receiving space 14. Accordingly, the rear wall 32 of the frame 16 is located in the vicinity of a wall 86 of the housing 12 that delimits the receiving space 14 to the rear. In particular, a seal 88 arranged on the rear wall 32 of the frame 16 can bear against the wall 86 in this regard.

Another arrow 90 in FIG. 7 shows how, after crossing the retaining teeth 82 (cf. FIG. 4) and reaching the retaining recess 80, the retaining tab 76 is lowered due to the force of gravity. Consequently, due to the force of gravity, the retaining tab 76 reaches the retaining recess 80, which is designed in the manner of a slot. This is because the frame 16 of the filter element 10 falls downwards due to the force of gravity as soon as the retaining tab 76 is at the height of the retaining recess 80 in the insertion direction 22.

This installation situation is shown in FIG. 8, in which the retaining tab 76 engages in the retaining recess 80. In the removal direction, i.e. counter to the insertion direction 22, the retaining tab 76 is undercut with the housing 12. The fastening element 26 is then also in its correct position, in which, after the cover 34 has been folded down or the cover 34 has been correspondingly pivoted about a pivot axis provided on the side of the housing 12, the rotary closure 40 can interact with the fastening element 26.

The removal of the filter element 10 from the receiving space 14 will be explained with reference to FIGS. 11 and 12. First of all, the frame 16 of the filter element 10 is raised in the region of the front wall 20 so that the retaining tab 76 is no longer located in the retaining recess 80. This movement of the retaining tab 76 out of the retaining recess 80 is illustrated in FIG. 11 by an arrow 104, the direction of the arrow being opposed to the arrow 90 shown in FIG. 7. Otherwise, the orientation of the filter element 10 shown in FIG. 7 in relation to the housing 12 corresponds to the orientation of the filter element 10 in relation to the housing 12 shown in FIG. 11.

The filter element 10 is then pulled out of the receiving space 14 counter to the insertion direction 22. This movement is illustrated by an arrow 94 in FIG. 12. Furthermore, a support web 96 of the frame 16 is shown in FIG. 12 in a partially cross-sectional view.

It can be seen from FIG. 13 that the frame 16 of the filter element 10 has two such support webs 96 in the present case. The support webs 96 connect the side walls 28, 30 to one another. This stabilizes the frame 16 of the filter element 10.

In addition, the support webs 96 have a plurality of extensions designed in the manner of teeth 98 of a comb. These teeth 98, which project upwards or in the vertical direction 68 from, in the present case, a strip-shaped back of the respective support web 96, engage from below in the folds of the filter material 18 (cf FIG. 1). In this way, in particular the teeth 98 of the support webs 96, which in the present case taper towards a free end, support the filter material 18. The provision of the support webs 96 and the teeth 98 ensures a high degree of dimensional stability of the frame 16 and in particular of the filter material 18, even if the filter element 10 is designed to be comparatively long in the insertion direction 22. The latter can be the case in particular when using the filter element 10 for an air filter device of a truck.

The support webs 96 ensure in particular that solids that have settled on the filter material 18 during operation of the air filter device can be easily tapped off or shaken off the filter material 18 without the folds of the filter material 18 being adversely affected.

From FIG. 12, in particular when viewed together with FIG. 4, it can be clearly seen that when the filter element 10 is pulled out of the receiving space 14 counter to the insertion direction 22, an underside of the support webs 96 is guided along respective ramps 100. The ramps 100 thus serve as run-up slopes for the filter element 10 when the filter element 10 is pulled out of the receiving space 14.

In the present case, two ramps 100 are formed on the wall 78, which are arranged laterally next to the retaining recess 80 in the direction of longitudinal extension of the retaining recess 80 or in the direction of the length of the retaining recess 80 designed in the manner of a slot (cf. FIG. 4).

Starting from an apex region 102 of the respective ramp 100, which is located approximately at the height of a front edge of the retaining recess 80, the ramps 100 are designed to slope obliquely downwards as viewed in the insertion direction 22. In the apex region 102, the ramps 100 have a height which is greater than a maximum height of the retaining teeth 82 in the present case. This prevents, in particular, the support webs 96 from catching on the retaining teeth 82 or getting caught on the retaining teeth 82 when the filter element 10 is pulled out of the receiving space 14 counter to the insertion direction 22 (cf. FIG. 12).

Furthermore, the ramps 100 are designed to slope obliquely upwards towards the apex region 102 as viewed in the insertion direction 22, as are the retaining teeth 82 (cf. FIG. 4). Accordingly, the ramps 100 also prevent the filter element 10 from being able to get caught in the retaining teeth 82 when the filter element 10 is inserted into the receiving space 14.

The ramps 100 also prevent the rear wall 32 of the frame 16 from catching on the retaining teeth 82, in particular, when the filter element 10 is pulled out of the receiving space 14, and the filter material 18 from being damaged when the filter element 10 is removed from the receiving space 14.

An alternative embodiment of the fastening element 26 located on the filter element 10 and the associated closure element 40, which is arranged on the cover 34, is shown in FIGS. 14 and 15. In contrast to FIGS. 2 and 10, the fastening element 26 is designed here in such a way that it has a sleeve-shaped retaining region 110. A retaining part 112 of the closure element 40 which is arranged on the cover 34 is inserted into this retaining region 110.

Here too, retaining parts 114 are provided on the fastening element 26 spaced apart from the front side 24, which engage behind the retaining part 112. This is followed by a rotation of the closure element 40 about the axis of rotation 70, as described above, which results in a clamping. Thus, a fixation of the filter element 10 in the receiving space 14 and a secure fixation of the cover 34 is achieved by an analogous geometry.

The invention claimed is:

1. A filter element for an air filter device of a motor vehicle, having a frame (16) which at least partially surrounds a filter material (18) of the filter element (10), wherein the frame (16) comprises a front wall (20) which extends essentially perpendicularly to an insertion direction (22), in which the filter element (10) can be inserted into a receiving space (14) of a housing (12) of the air filter device, wherein at least one fastening element (26) is arranged on a front side (24) of the front wall (20), onto which a cover (34) of the air filter device designed to close the receiving space (14) can be fixed, characterised in that a plate-shaped base body (60) of the front wall (20) has a narrow side (72) beyond which a retaining tab (76) of the filter element (10) formed separately from the at least one fastening element (26) projects, wherein the filter element (10) can be secured against movement in or opposite to the insertion direction (22) by introducing the retaining tab (76) into a retaining recess (80) provided on the side of the housing (12) of the air filter device$_2$; and;

further characterised in that the at least one fastening element (26) can be inserted into a sleeve-shaped retaining region (66) of a closure element (40) arranged on the cover (34), wherein, by rotating the closure element (40) about an axis of rotation (70), the at least one fastening element (26) encompassed by the retaining region (66) can be clamped by the closure element (40) of the cover (34).

2. The filter element according to claim 1, characterised in that the at least one fastening element (26) has at least one retaining part (44, 46) which is spaced apart from the front side (24) of the front wall (20) and behind which a corresponding retaining part (56) of the closure element (40) can engage in order to close the receiving space (14) by means of the cover (34).

3. The filter element according to claim 2, characterised in that the at least one retaining part (44, 46) is designed as a wing projecting from a shaft (42) of the fastening element (26) transversely to the insertion direction (22) and/or the at least one retaining part (44, 46) has a shape extending in a ramp-like manner from a first end region (48) of the retaining part (44, 46) to a second end region (50) of the retaining part (44, 46).

4. An air filter device for a motor vehicle, having a filter element (10) having a frame (16) which at least partially surrounds a filter material (18) of the filter element (10), wherein the frame (16) comprises a front wall (20) which extends essentially perpendicularly to an insertion direction (22), in which the filter element (10) can be inserted into a receiving space (14) of a housing (12) of the air filter device, wherein at least one fastening element (26) is arranged on a front side (24) of the front wall (20), onto which a cover (34) of the air filter device designed to close the receiving space (14) can be fixed, characterised in that a plate-shaped base body (60) of the front wall (20) has a narrow side (72) beyond which a retaining tab (76) of the filter element (10) formed separately from the at least one fastening element (26) projects; and, wherein the filter element (10) can be secured against movement in or opposite to the insertion direction (22) by introducing the retaining tab (76) into a retaining recess (80) provided on the side of the housing (12) of the air filter device, wherein the filter element (10) is introduced into a receiving space (14), which is formed in a housing (12) of the air filter device, wherein, when the retaining tab (76) of the filter element (10) engages in a retaining recess (80) provided on the side of the housing (12) of the air filter device, the receiving space (14) can then be closed by means of a cover (34) of the air filter device, which can be fixed to the at least one fastening element (26) of the filter element (10).

5. The air filter device according to claim 4, characterised in that the at least one fastening element (26) has a sleeve-shaped retaining region (110), into which the closure element (40) arranged on the cover (34) can be inserted, wherein, by rotating the closure element (40) about an axis of rotation (70), the at least one closure element (40) of the cover (34) encompassed by the retaining region (110) can be clamped by the fastening element (26).

6. The air filter device according to claim 5, characterised in that the closure element (40) has at least one retaining part (112) which is spaced apart from the front side (24) of the front wall (20) and behind which a corresponding retaining part (114) of the fastening element (26) can engage in order to close the receiving space (14) by means of the cover (34).

7. The air filter device according to claim 4, characterised in that the frame (16) of the filter element (10) comprises two side walls (28, 30) which extend from the front wall (20) in the insertion direction (22), wherein the filter element (10) has at least one support web (96) spaced apart from the front wall (20) and supporting the filter material (18), which connects the side walls (28, 30) to one another.

8. The air filter device according to claim 4, characterised in that the housing (12) of the air filter device has at least one retention element (82), in particular designed as a ramp-like retaining tooth sloping obliquely upwards as viewed in the insertion direction (22), which is arranged upstream of the retaining recess (80) in the insertion direction (22).

9. The air filter device according to claim 4, characterised in that the housing has at least one ramp (100) which is arranged next to the retaining recess (80) in the direction of longitudinal extension of the retaining recess (80), wherein the at least one ramp (100) is designed sloping obliquely downwards starting from the retaining recess (80) as viewed in the insertion direction (22).

10. The air filter device according to claim 8, characterised in that the at least one ramp (100) has an apex region (102), wherein a height of the at least one ramp (100) in the apex region (102) is greater than a maximum height of the at least one retention element (82) and/or the at least one ramp (100) is designed to slope obliquely upwards towards the apex region (102) as viewed in the insertion direction (22).

11. The air filter device according to claim 4, characterised in that the cover (34), which is held on the housing (12) in particular so as to be pivotable about a pivot axis, has at least one closure element (40) which is rotatable relative to a base body (38) of the cover (34), wherein in a closed position of the closure element (40), at least one retaining part (56) of the closure element (40) engages behind a corresponding retaining part (44, 46) of the at least one fastening element (26), or a retaining part (110) of the fastening element (26) engages behind a corresponding retaining part (112) of the closure element (40).

* * * * *